United States Patent [19]
Christian

[11] Patent Number: 5,981,113
[45] Date of Patent: Nov. 9, 1999

[54] CURABLE INK COMPOSITION AND IMAGED RETROREFLECTIVE ARTICLE THEREFROM

[75] Inventor: Paul D. Christian, Apple Valley, Minn.

[73] Assignee: 3M Innovative Properties Company, St. Paul, Minn.

[21] Appl. No.: 08/767,743

[22] Filed: Dec. 17, 1996

[51] Int. Cl.⁶ ............... G03C 3/00; G02B 5/122; G02B 5/124; C08F 2/50
[52] U.S. Cl. ................. 430/9; 430/10; 430/14; 430/16; 359/529; 359/530; 359/531; 359/532; 359/533; 522/18; 522/28; 522/75; 522/182
[58] Field of Search ............... 522/75, 182, 120, 522/121, 18, 28; 523/160; 359/529, 530, 531, 532, 533; 430/9, 10, 14, 16

[56] References Cited

U.S. PATENT DOCUMENTS

| | | | |
|---|---|---|---|
| 3,190,178 | 6/1965 | McKenzie | 88/82 |
| 3,648,348 | 3/1972 | Freimuth | 29/200 B |
| 3,786,116 | 1/1974 | Milkovich et al. | 260/885 |
| 3,840,390 | 10/1974 | Kozu et al. | 117/117 |
| 3,842,059 | 10/1974 | Milkovich et al. | 260/93.5 A |
| 3,856,744 | 12/1974 | Radlove et al. | 260/40 R |
| 4,025,159 | 5/1977 | McGrath | 350/105 |
| 4,265,723 | 5/1981 | Hesse et al. | 204/159.23 |
| 4,312,726 | 1/1982 | Vrancken et al. | 522/182 |
| 4,668,601 | 5/1987 | Kistner | 430/162 |
| 4,801,193 | 1/1989 | Martin | 350/103 |
| 4,826,890 | 5/1989 | Gupta | 522/114 |
| 4,826,891 | 5/1989 | Gupta | 522/114 |
| 4,895,428 | 1/1990 | Nelson et al. | 350/103 |
| 4,896,943 | 1/1990 | Tolliver et al. | 350/105 |
| 4,938,563 | 7/1990 | Nelson et al. | 350/103 |
| 5,061,602 | 10/1991 | Koch et al. | 522/121 |
| 5,064,272 | 11/1991 | Bailey et al. | 359/541 |
| 5,066,098 | 11/1991 | Kult et al. | 359/540 |
| 5,106,885 | 4/1992 | Liu et al. | 522/31 |
| 5,147,952 | 9/1992 | Mori et al. | 526/220 |
| 5,468,540 | 11/1995 | Lu | 428/156 |
| 5,523,168 | 6/1996 | Siol et al. | 428/428 |
| 5,585,221 | 12/1996 | Noguchi et al. | 522/149 |

FOREIGN PATENT DOCUMENTS

| | | |
|---|---|---|
| 0 187 045 | 7/1986 | European Pat. Off. . |
| 0 457 499 A1 | 11/1991 | European Pat. Off. . |
| WO 95/08596 | 3/1995 | WIPO . |

*Primary Examiner*—Susan W. Berman
*Attorney, Agent, or Firm*—F. Andrew Ubel

[57] ABSTRACT

Radiation curable ink compositions and coating compositions contain an aliphatic (meth)acrylate functional macromonomer, a reactive acrylate monomer, and a photoinitiator. Ink compositions also contain an effective amount of a colorant or pigment. These inks, when cured by exposure to actinic radiation, have excellent durability, weatherability, and adhesion to acrylate substrates such as polymethylmethacrylate.

11 Claims, No Drawings

CURABLE INK COMPOSITION AND IMAGED RETROREFLECTIVE ARTICLE THEREFROM

FIELD OF THE INVENTION

This invention is directed to ink compositions that are curable by exposure to actinic radiation such as ultraviolet radiation and that contain an aliphatic acrylate functional macromonomer. The invention is also directed to protective coating compositions that contain these macromonomers.

BACKGROUND OF THE INVENTION

The use of actinic radiation, such as ultraviolet radiation, to cure ink compositions is generally known in the art. Ultraviolet radiation can be used to cure various types of inks, such as thiolene inks, inks made up of aryl diazonium salts and epoxy resins, and inks containing acrylates including acrylated epoxies and urethanes. Of these, acrylate containing inks are often preferred because they are available at a reasonable cost and have good storage stability in addition to their useful properties as inks.

Acrylate type UV curable inks are typically made up of a pigment dispersed in a reactive base that may contain photoinitiators, reactive monomers or oligomers, preservatives, flow agents, and so on. The properties of the ink such as viscosity, gloss, and crosslink density can be controlled by varying the types and/or proportions of reactive diluents used in the formulation.

Radlove et al., in U.S. Pat. No. 3,856,744 describe photopolymerizable ink compositions that comprise an ethylenically unsaturated beta-hydroxy ester, a polyitaconate, and optionally a polyacrylate which functions as a reactive diluent. The Radlove compositions must contain 2 to 10 wt-% of the polyitaconate.

In U.S. Pat. No. 4,826,890 Gupta teaches radiation curable coating compositions that comprise a copolymer of dialkyl muconate and p-acetoxystyrene, a polyethylenically unsaturated radiation polymerizable compound, and optionally a monoethylenically unsaturated monomer such as an acrylate or methacrylate. Additional examples of radiation curable coatings are found in Wojnarowicz, EP 457 499; Kistner, U.S. Pat. No. 4,668,601; Liu et al., U.S. Pat. No. 5,106,885; and Hesse et al., U.S. Pat. No. 4,265,723.

Macromonomers, also known as high molecular weight monomers, are large molecules made up of repeating monomeric units and terminated by a polymerizable end group. These large monomers have long been used in the preparation of graft copolymers to provide uniform side chains or branches. Milkovich, U.S. Pat. Nos. 3,786,116 and 3,842,059 are examples of the use of macromonomers in the synthesis of graft copolymers. Acrylate containing macromonomers are known, as seen for example in Mori, U.S. Pat. No. 5,147,952.

Attempts have been made to incorporate macromonomers into UV curable inks. In EP 187,045, Kerr teaches the use of macromonomers in the preparation of radiation curable printing inks. The macromonomers used by Kerr have a repeating unit that is a vinyl aromatic monomer. Properties such as storage stability, adhesiveness, durability and so on are attributed by Kerr to the large mass of vinyl aromatic in the macromonomer. However, compositions containing high proportions of an aromatic monomer can have certain undesirable properties. For example, these compositions may be vulnerable to degradation by ultraviolet light, resulting in poor durability and short product life for applications where significant outdoor exposure is required. Aromatic macromonomer containing ink compositions may not adhere well to non-aromatic polymer substrates such as polymethylmethacrylate, making them less well suited to use in constructions containing such materials.

A need exists for radiation curable ink compositions that are durable, resistant to ultraviolet light once cured, and that adhere well to acrylate substrates.

SUMMARY OF THE INVENTION

The invention provides a radiation curable ink made up of an aliphatic acrylate functional macromonomer; a reactive acrylate monomer; an effective amount of a colorant; and an effective amount of a photoinitiator. These inks offer good resistance to ultraviolet light once cured, have excellent adhesion to acrylate film substrates such as polymethylmethacrylate, and can be either transparent or opaque.

The invention further provides a radiation curable coating that comprises an aliphatic acrylate functional macromonomer; a reactive acrylate monomer; and an effective amount of a photoinitiator. Radiation curable coatings according to the invention provide a durable, protective layer to a wide variety of substrates.

As used herein, the term "aliphatic" is inclusive of all non-aromatic acyclic or cyclic functionalities. The aliphatic moieties may be saturated or unsaturated, and may be substituted.

The macromonomers used in the invention comprise one or more aliphatic repeating units and have a polymerizable end group. These macromonomers generally have a number average molecular weight of about 3,000 to 15,000.

The durability and ultraviolet light resistance of the inks makes them particularly useful in applications where outdoor use is contemplated, such as in the imaging of retroreflective sheetings for durable traffic signage applications. The inventive coating may be used alone or in combination with the ink to provide additional protection from ultraviolet light and resistance to weathering.

DETAILED DESCRIPTION OF THE INVENTION

The macromonomer component of the ink composition is an aliphatic molecule having a number average molecular weight ($\overline{M}n$) of about 3,000 to 15,000, preferably about 6,000 to 10,000 that is made up of one or more aliphatic repeating units and has a polymerizable end group. Inclusion of such a macromonomer improves the adhesion of the ink to acrylate type films such as polymethylmethacrylate (PMMA) and also provides good solvent resistance properties.

The repeating units that make up the macromonomer are aliphatic, i.e. they do not contain any aromatic functionality. These cyclic or acyclic aliphatic repeating units may be either saturated or unsaturated and may be substituted as desired with non-aromatic substituent groups. Examples of suitable repeating groups include aliphatic ethylenically unsaturated carboxylic acids, esters, and other groups that will not interfere with the curing of the ink. Of these, ethylenically unsaturated acids such as acrylic acid and methacrylic acid are among the preferred repeating groups in the macromonomer component of the inks. The repeating groups found in the macromonomer may be the same or different.

The polymerizable end group of the macromonomer is typically an aliphatic, ethylenically unsaturated group that is capable of reaction with one or more of the reactive acrylate monomers used to prepare the inks. This reactive functionality allows the macromonomer to be crosslinked directly into certain film substrates by free radical polymerization initiated by exposure to ultraviolet radiation. Examples of useful monomers for providing ethylenically unsaturated end groups (such as (meth)acrylate end groups) for the macromonomer include ethylenically unsaturated carboxylic acids, such as acrylic and methacrylic acid.

Preferred macromonomers include compounds of the formula (I) or (II):

wherein
R is H, $C_{1-20}$ alkyl which may be straight-chain or branched, or $C_{1-20}$ alkoxy which may be straight-chain or branched;

R2 is $C_{1-20}$ alkylene which may be straight or branched and which may be interrupted by one or more —CONR3—, —NR3CO—, —COO—, or —OCO— linkages;

R1 is

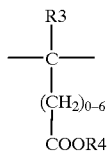

wherein R3 and R4 are each independently H or $C_{1-6}$ alkyl which may be straight-chain or branched;

X is

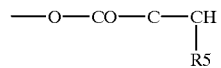

wherein R5 is H or $C_{1-6}$ alkyl; and n is a number sufficient to provide the desired molecular weight, typically about 10 to 210.

Preferred macromonomers are those which have a methylmethacrylate, isobutyl methacrylate or isobutylmethacrylate/isooctylacrylate repeating unit. Especially preferred macromonomers have a methyl/methacrylate repeating unit and a methacrylic acid end group. Suitable methylmethacrylate macromonomers are available commercially as macromonomer resins AA-10 and AA-6 from Toagosei Co. LTD, Tokyo, Japan and macromonomer resin ELVACITE EP-M1010 from ICI Acrylics, Inc., Wilmington, Del.

The macromonomer is present in the inks of the invention in an amount effective to provide the ink with the desired adhesion, weathering and solvent resistance properties. Generally, the macromonomer makes up about 10 to 60 wt-% of the ink, preferably about 25 to 35 wt-%.

One or more reactive acrylate monomers are present in the ink compositions. These reactive monomers function as diluents or solvents for the macromonomer and other components; as pigment binders, as viscosity reducers, and as crosslinking agents.

In general, any radiation curable substituted or unsubstituted ester of an ethylenically unsaturated mono- or poly-carboxylic acid may be used as a reactive acrylate component of the ink composition. Preferably, the acrylate monomer has a terminal vinyl group and more preferably has a terminal

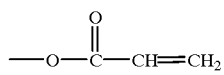

group.

Particularly preferred reactive acrylate monomers include hexanedioldiacrylate, tetrahydrofurfuryl acrylate, isobornyl acrylate, ethoxyethoxyethyl acrylate, propoxylated neopentylglycol diacrylate, and trimethylolpropane triacrylate.

The reactive acrylate monomer, or the combined reactive acrylate monomers generally make up about 25 to 70 wt-% of the ink composition, preferably about 45 to 55 wt-%. If a mixture of reactive acrylate monomers is used, the amount of each monomer used may be varied as necessary to provide the final composition with the desired combination of properties.

A nonreactive solvent may be included in the ink, if desired, to provide properties such as improved flow or wetting. Examples of such solvents include organic solvents such as ethanol, isopropanol, methyl ethyl ketone, and the like.

The pigment used in the ink composition provides the desired color. Durable pigments are preferred for use in the inks of the invention, meaning that they have good outdoor durability and resist fading upon exposure to sun and the elements.

Pigments useful in the invention may be organic or inorganic. Suitable inorganic pigments include carbon black and titania ($TiO_2$), while suitable organic pigments include phthalocyanines, anthraquinones, perlenes, carbazoles, monoazo- and disazobenzimidazolone, isoindolinones, monoazonaphthol, diarylidepyrazolone, rhodamine, indigoid, quinacridone, diazopyranthrone, dinitraniline, pyrazolone, dianisidine, pyranthrone, tetrachloroisoindolinone, dioxazine, monoazoacrylide, anthrapyrimidine. It will be recognized by those skilled in the art that organic pigments will be differently shaded, or even have different colors, depending on the functional groups attached to the main molecule.

Commercial examples of useful organic pigments include those known under the trade designations PB 1, PB 15, PB 15:1, PB 15:2, PB 15:3, PB 15:4, PB 15:6, PB 16, PB 24, and PB 60 (blue pigments); PB 5, PB 23, and PB 25 (brown pigments); PY 3, PY 14, PY 16, PY 17, PY 24, PY 65, PY 73, PY 74, PY 83, PY 95, PY 97, PY 108, PY 109, PY 110, PY 113, PY 128, PY 129, PY 138, PY 139, PY 150, PY 154, PY 156, and PY 175 (yellow pigments); PG 1, PG 7, PG 10, and PG 36 (green pigments); PO 5, PO 15, PO 16, PO 31, PO 34, PO 36, PO 43, PO 48, PO 51, PO 60, and PO 61 (orange pigments); PR 4, PR 5, PR 7, PR 9, PR 22, PR 23, PR 48, PR 48:2, PR 49, PR 112, PR 122, PR 123, PR 149, PR 166, PR 168, PR 170, PR 177, PR 179, PR 190, PR 202, PR 206, PR 207, and PR 224 (red); PV 19, PV 23, PV 37, PV 32, and PV 42 (violet pigments); and PBLACK (black).

The pigment is generally incorporated into the ink composition by milling the pigment into selected reactive monomers or macromonomer resin. If the ink is to be used in applications wherein the ink is used in combination with a retroreflective backing, the pigment must be milled to a particle size that provides sufficient transparency to permit retroreflection and provide retroreflective color. This may be accomplished, for example, by milling the pigment.

Although the precise size will vary with the nature of the pigment used, milling the pigment to a particle size of about 10 to 100 nm will provide the desired transparency. An effective amount of pigment is used to provide the desired color and intensity to the ink. In general, about 1 to 15 wt-% pigment is found in the ink compositions. The exact amount used will vary with the pigment used and color desired.

A photoinitiator is included in the inks to allow the composition to cure on exposure to actinic radiation such as ultraviolet radiation. Any of the photoinitiators known in the art may be employed, such as alpha cleavage or hydrogen abstraction type photoinitiators. Preferred photoinitiators include IRGACURE Brand 184, 651, 369, 1700, 1800, and 1850 and DAROCUR Brand 1173 and 4265 from Ciba-Geigy Inc., Ardsey, N.Y.

The photoinitiator is present at levels sufficient to cause curing of the compositions, typically about 1 to 6 wt-% of the ink composition.

Other additives may also be present in the ink compositions of the invention to provide additional properties as needed. Such additives, if used, may be reactive with the macromonomer but should not adversely affect the curing of the ink. Examples of such additives include flow agents, leveling agents, viscosity modifiers, antioxidants, hindered amine light stabilizers (HALS), moisture scavengers, ultraviolet light absorbers (UVA's) and the like. If used, these additives are individually present in amounts ranging from about 0.5 to 5 wt-% of the ink composition.

The inks of the invention are prepared by combining the selected pigment with one or more acrylate monomer or macromonomer resins by a milling process, creating a millbase or dispersion. The pigment may generally be added as a paste dispersion or as a solid chip or powder dispersion. The macromonomer, if in non-liquid form, may be dissolved in an appropriate amount of reactive acrylate monomer. The millbase and macromonomer solution are then combined with any additional reactive acrylate monomer, photoinitiators, and other ingredients. These components may be combined in any effective order with stirring between additions. They may also be mixed together in a single step, "one pot" process in a reaction vessel.

The "one pot" method of preparation is generally preferred. In this method the pigment is first triple-roll milled into the liquid monomer(s), forming a paste, or two-roll milled into a solid resin, forming a chip or powder dispersion. Additional monomer(s) are added to a mixing vessel with stirring. All remaining ingredients except the photoinitiator are added to the vessel with moderate stirring. When all ingredients are added the mixing speed is increased to high until all solids are dissolved and a homogeneous solution is obtained. The mixing speed is adjusted as needed to maintain the mixture at a constant temperature. Mixing is then slowed, the solution is protected from light, and the photoinitiator is added with mixing at moderate speed until fully incorporated. This method, with the pigment added as a solid chip or powder dispersion, is particularly preferred.

The procedure followed for the two step method of preparation will vary depending on the type of pigment dispersion added. If the pigment is added as a paste dispersion, the pigment is triple-roll milled into a liquid monomer(s) to form a paste. The solid macromonomer resin is stirred at high speed into a sufficient amount of liquid monomer(s) to dissolve the macromonomer and form a viscous liquid. The pigment and viscous liquid are combined with all remaining ingredients except the photoinitiator and stirred until a homogeneous solution is obtained. Mixing is then slowed, the solution is protected from light, and the photoinitiator is added with mixing at moderate speed until fully incorporated.

If the pigment is added as a solid chip or powder dispersion, then the pigment is two-roll milled into a sufficient quantity of solid macromonomer resin to form a chip or powder dispersion. This dispersion is mixed at high speed into a sufficient amount of liquid monomer(s) to dissolve the macromonomer and obtain a homogeneous, viscous pigment solution. The remaining macromonomer is stirred at high speed into a sufficient quantity of liquid monomer(s) to dissolve the macromonomer and form a viscous liquid. The pigment solution, viscous macromonomer solution and all remaining ingredients except the photoinitiator are combined and stirred until a homogeneous solution is obtained. Mixing is slowed, the solution is protected from light, and the photoinitiator is added with mixing at moderate speed until fully incorporated.

The radiation curable inks of the composition are generally used by screen printing the ink onto the desired article or substrate and subjecting the layer of ink to radiation such as ultraviolet radiation to effect a cure. The ink may be used to form any desired image. For example, the image may be selective or discrete, such as text, alphanumerics, graphic symbols, or designs and the like, or the ink can form a continuous layer across the entire surface of the substrate. A preferred substrate is retroreflective sheeting such as enclosed or encapsulated lens retroreflective sheetings including microsphere type and cube corner type retroreflective sheetings. Illustrative encapsulated lens sheetings are described in U.S. Pat. Nos. 3,190,178; 4,025,159; 4,896,943; 5,064,272 and 5,066,098, all of which are incorporated herein by reference. Illustrative cube corner sheetings are disclosed in U.S. Pat. Nos. 3,648,348; 4,801,193; 4,895,428 and 4,938,563, all of which are incorporated herein by reference.

In addition to radiation curable inks, the invention provides a radiation curable, durable coating composition. This composition includes an aliphatic macromonomer, one or more reactive acrylate monomers, photoinitiators, and additives as described above for the inks, but a pigment is not included. The coating composition is prepared in the manner as the inks, with the exception of the pigment compounding step.

The radiation curable coating composition may be used alone to provide gloss, solvent resistance, cleanability, durability and weatherability to any selected substrate, or it may be used as a top coat for the inks of the invention. The combination of a radiation curable ink of the invention and the coating composition of the invention allows the incorporation of color into articles while providing excellent cleanability, durability and weatherability.

The inks and coatings of the invention are further described in the examples that follow. These examples are understood to be merely illustrative and not limiting of the invention. The examples are of coating and ink formulations which may be prepared using any of the methods described above. Example 8 was prepared using a solid chip pigment dispersion.

EXAMPLES

The following abbreviations are used throughout the examples:
HDDA—hexanediol diacrylate;
THFFA—tetrahydrofurfuryl acrylate;
IBOA—isobornyl acrylate;
EEEA—ethoxyethoxyethyl acrylate;
NPGPDA—neopentylglycol diacrylate;

(PO)NPGPDA—propoxylated neopentylglycol diacrylate;
TMPTA—trimethylolpropane triacrylate;
PEA—phenoxyethyl acrylate;
IRGACURE 1700—photoinitiator blend of bis(2,6-dimethylbenzoyl)-2,44-trimethyl pentyl phosphine oxide and 2-hydroxy-2-methyl-1-phenyl-1-propanone;
DC163—polydimethyl siloxane;
Modaflow—acrylic copolymer flow additive.

Examples 1

| Ingredient | Wt-% |
|---|---|
| Toagosei AA-10 acrylic macromer | 23.0 |
| HDDA | 30.0 |
| THFFA | 20.0 |
| Phthalo blue pigment | 6.2 |
| NPGPDA | 16.7 |
| Modaflow | 0.9 |
| IRGACURE 1700 | 3.2 |

Example 2

| Ingredient | Wt-% |
|---|---|
| 20% PB7 black pigment in EEEA/(PO)NPGDA ethoxyethoxyethyl acrylate | 20 |
| 50/50 mixture of Toagosei AA-6 macromonomer in HDDA | 58 |
| THFFA | 14 |
| HDDA | 1 |
| IRGACURE 1700 | 5 |
| DC163 | 2 |

Example 3

| Ingredient | Wt-% |
|---|---|
| 20% PB7 black & pigment in (PO)NPGDA | 20 |
| 50/50 mixture of AA-6 macromonomer in HDDA | 58 |
| THFFA | 14 |
| HDDA | 1 |
| IRGACURE 1700 | 5 |
| DC163 | 2 |

Example 4

| Ingredient | Wt-% |
|---|---|
| 20% PB7 black pigment in EEEA/(PO)NPGDA | 19 |
| AA-6/HDDA (50/50) | 16 |
| AA-6/THFFA (50/50) | 42 |
| HDDA | 16 |
| IRGACURE 1700 | 5 |
| DC163 | 2 |

Example 5

| Ingredient | Wt-% |
|---|---|
| 20% PB7 black pigment in (PO)NPGDA | 20.5 |
| AA-6/HDDA (50/50) | 27 |
| AA-6/THFFA (50/50) | 30 |
| HDDA | 9 |
| THFFA | 7 |
| IRGACURE 1700 | 5 |
| Modaflow | 1.5 |

Example 6

| Ingredient | Wt-% |
|---|---|
| HDDA | 38.1 |
| THFFA | 21.4 |
| Toagosei AA-6 | 28.8 |
| Acryloid B-67 acrylic resin - a non-reactive isobutylmethacrylate polymer from Rohm & Haas | 3.2 |
| Photoinitiator | 3.0 |
| Silicone flow agent | 1.5 |
| Hindered amine light stabilizer | 2.0 |
| Phenolic antioxidant | 2.0 |

Example 7

| Ingredient | Wt-% |
|---|---|
| HDDA | 35.0 |
| THFFA | 12.5 |
| IBOA | 12.0 |
| Toagosei AA-6 | 30.0 |
| Acryloid B-67 acrylic resin - a non-reactive isobutylmethacrylate polymer from Rohm & Haas | 6.0 |
| Photoinitiator | 3.0 |
| Silicone flow agent | 1.5 |

Example 8

| Ingredient | Wt-% |
|---|---|
| HDDA | 30.0 |
| THFFA | 30.0 |
| 50% Pigment Red 179/AA-6 chip dispersion | 14.0 |
| Toagosei AA-6 macromonomer | 19.5 |
| Photoinitiator | 5.0 |
| Silicone flow agent | 1.5 |

What is claimed is:

1. A retroreflective sheeting comprising a retroreflective layer and on said layer an image formed from radiation cured ink, the ink prior to being cured comprising:
   (a) an aliphatic (meth)acrylate functional macromonomer having a backbone provided by polymerization of aliphatic (meth)acrylate monomer;
   (b) a reactive acrylate monomer;
   (c) an effective amount of colorant; and
   (d) an effective amount of photoinitiator.
2. The retroreflective sheeting of claim 1 wherein the aliphatic acrylate functional macromonomer comprises a methylmethacrylate macromonomer.

3. The retroreflective sheeting of claim 1 wherein the aliphatic acrylate functional macromonomer has a methacryloyl end group.

4. The retroreflective sheeting of claim 1 wherein the reactive acrylate monomer comprises a mixture of mono- and di-acrylates.

5. The retroreflective sheeting of claim 4 wherein the diacrylate:monoacrylate mixture has a ratio of about 2:1 to 0.85:1.

6. The retroreflective sheeting of claim 1 wherein the reactive acrylate monomer comprises tetrahydrofurfuryl acrylate, isobornyl acrylate, hexanedioldiacrylate, ethoxyethoxyethyl acrylate, propoxyneopentylglycol diacrylate, trimethylolpropane triacrylate, or a mixture thereof.

7. The retroreflective sheeting of claim 1 wherein the photoinitiator comprises a bis aceto-phosphine oxide blended with an alpha-hydroxy acetophenone.

8. The retroreflective sheeting of claim 1 wherein the photoinitiator comprises a phosphine oxide, an alpha cleavage type or a hydrogen-abstraction type photoinitiator.

9. The retroreflective sheeting of claim 1 wherein the photoinitiator comprises a phosphine oxide blended with an alpha-hydroxy ketone.

10. The sheeting of claim 1 further comprising a radiation cured top coat, the top coat prior to being cured comprising:
    (a) an aliphatic acrylate functional macromonomer having a backbone provided by polymerization of aliphatic (meth)acrylate monomer;
    (b) a reactive acrylate monomer; and
    (c) an effective amount of a photoinitiator.

11. A signage article comprising the retroreflective sheeting of claim 1 adhered to a substrate.

* * * * *